United States Patent
Noguchi et al.

(10) Patent No.: US 11,359,997 B2
(45) Date of Patent: Jun. 14, 2022

(54) CHASSIS DYNAMOMETER FOR TESTING A TWO WHEEL DRIVE VEHICLE, CONTROL METHOD FOR THE SAME, AND CHASSIS DYNAMOMETER PROGRAM FOR TESTING A TWO WHEEL DRIVE VEHICLE

(71) Applicant: HORIBA, LTD., Kyoto (JP)

(72) Inventors: Shinji Noguchi, Kyoto (JP); Kaori Adachi, Kyoto (JP)

(73) Assignee: HORIBA, LTD., Kyoto (JP)

(*) Notice: Subject to any disclaimer, the term of this patent is extended or adjusted under 35 U.S.C. 154(b) by 298 days.

(21) Appl. No.: 16/502,278

(22) Filed: Jul. 3, 2019

(65) Prior Publication Data
US 2020/0011765 A1 Jan. 9, 2020

(30) Foreign Application Priority Data
Jul. 4, 2018 (JP) .............................. JP2018-127873

(51) Int. Cl.
*G01M 17/007* (2006.01)
*G01M 17/02* (2006.01)

(52) U.S. Cl.
CPC ...... *G01M 17/0076* (2013.01); *G01M 17/022* (2013.01)

(58) Field of Classification Search
CPC ........... G01M 17/022; G01M 17/0074; G01M 17/0076
See application file for complete search history.

(56) References Cited

U.S. PATENT DOCUMENTS

| 4,635,472 A | 1/1987 | Scourtes |
| 5,335,537 A | 8/1994 | Shibayama et al. |
| 6,257,054 B1* | 7/2001 | Rostkowski ............. G01L 3/22 73/116.08 |

FOREIGN PATENT DOCUMENTS

| JP | 05-005676 A | 1/1993 |
| JP | 06-288869 A | 10/1994 |
| JP | 2003-520957 A | 7/2003 |
| JP | 2016-080636 A | 5/2016 |

(Continued)

OTHER PUBLICATIONS

EESR dated Dec. 3, 2019 issued for European Patent Application No. 19 184 103.0, 8 pgs.

(Continued)

*Primary Examiner* — Eric S. McCall
*Assistant Examiner* — Timothy P Graves
(74) *Attorney, Agent, or Firm* — Brooks Kushman P.C.

(57) ABSTRACT

A chassis dynamometer that tests a two-wheel drive vehicle includes: a driving wheel side roller on which the driving wheels of the vehicle are placed; a driven wheel side roller on which the driven wheels of the vehicle are placed; a driving wheel side power absorbing part connected to the driving wheel side roller; a driven wheel side power absorbing part connected to the driven wheel side roller; a braking force measuring part that, via the driven wheel side power absorbing part, measures braking force exerted on the driven wheel side roller; and a control part that with use of the braking force measured by the braking force measuring part, sets the control target value of the power absorbing force of the driving wheel side power absorbing part to control the driving wheel side power absorbing part.

7 Claims, 1 Drawing Sheet

(56) References Cited

FOREIGN PATENT DOCUMENTS

JP          2016080636 A  *  5/2016
WO           01-53791 A1     7/2001

OTHER PUBLICATIONS

Office Action dated Dec. 23, 2021 issued in JP patent application No. 2018-127873, 4 pgs.
Notice of Allowance dated Mar. 8, 2022 issued in JP patent application No. 2018-127873, 5 pgs.

* cited by examiner

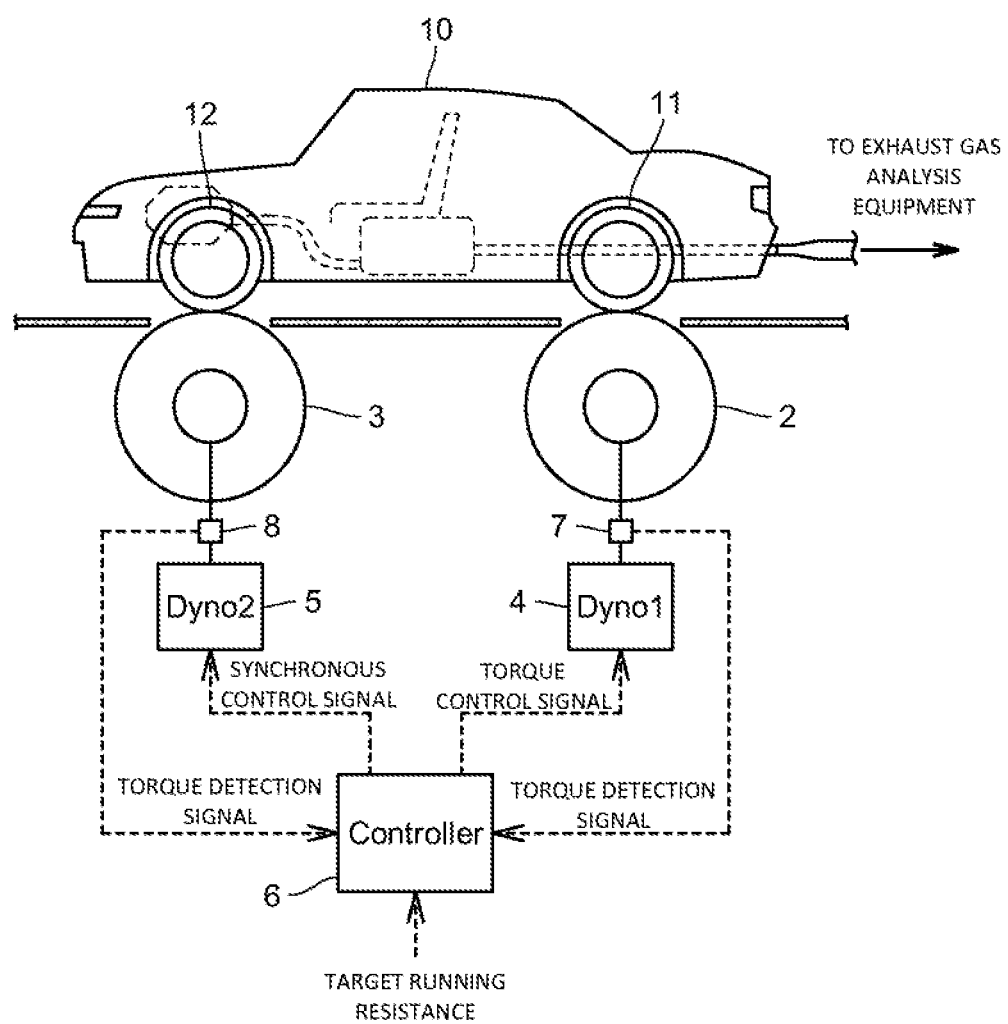

CHASSIS DYNAMOMETER FOR TESTING A TWO WHEEL DRIVE VEHICLE, CONTROL METHOD FOR THE SAME, AND CHASSIS DYNAMOMETER PROGRAM FOR TESTING A TWO WHEEL DRIVE VEHICLE

CROSS-REFERENCE TO RELATED APPLICATION

This application claims priority to Japanese Application No. 2018-127873, filed Jul. 4, 2018, the disclosure of which is incorporated in its entirety by reference herein.

TECHNICAL FIELD

The present invention relates to a chassis dynamometer and the like for testing two-wheel drive vehicles.

BACKGROUND ART

In recent years, vehicle control technology has been advancing, and a vehicle that senses an unstable running state if all four wheels do not rotate even in the case of a two-wheel drive vehicle and comes into a protective control state has been increasing in number.

When testing such a two-wheel drive vehicle using a chassis dynamometer, as disclosed in Patent Literature 1, not only the driving wheels are placed on the driving wheel side roller, but the driven wheels are also placed on the driven wheel side roller. Then, control is performed so as to exert a load serving as running resistance on the driving wheel side roller, as well as to make the driven wheel side roller follow at the same speed as the rotation speed of the driving wheel side roller.

In a simulated running test using the chassis dynamometer, what decelerate a two-wheel drive vehicle are only the driving wheel side brakes. For this reason, when exerting the same braking force as in the case of an actual road run to perform a desired deceleration mode as the entire vehicle, it is necessary to give large operating force to the driving wheel side brakes and make the driving wheel side brakes generate the same braking force as that generated by both the driving wheel side brakes and the driven wheel side brakes.

However, when increasing the operating force on the brakes as described above, not only on the driving wheel side, but operating force exerted on the driven wheel side brakes is increased to increase a calorific value. In particular, in the case of a rear-wheel drive vehicle, the rear wheel side brakes have braking ability only one half or less than that of the front wheel side brakes in many cases to cause not only insufficiency of the braking force on the driving wheel side but the overheat of the driving wheel side brakes when pressing harder on the brake pedal in order to make the braking force effective. Further, larger operating force is exerted on the driven wheel side brakes having higher braking ability to cause serious problems such as not only the overheat but tire damage due to brake lock-up, the impossibility of keeping driven wheel side speed, and the like.

CITATION LIST

Patent Literatures

Patent Literature 1: Japanese Unexamined Patent Application Publication No. 2016-80636

SUMMARY OF INVENTION

Technical Problem

In the above-described chassis dynamometer, in order to reduce the operating force on the brakes, the present inventor considers preliminarily setting the braking force of the driven wheel side brakes and making a driving wheel side power absorbing part connected to the driving wheel side roller secondarily absorb the braking force of the driven wheel side brakes. That is, the present inventor considers adding the preliminarily set braking force of the driven wheel side brakes to the control target value of the absorbing force of the driving wheel side power absorbing part. This enables the excessive operation of the driving wheel side brakes to be prevented.

However, the braking force of the driven wheel side brakes is different depending not only on a vehicle type but on each vehicle even in the case of the same vehicle type, and therefore it is necessary to preliminarily set the braking force for each test vehicle. Also, the setting is extremely complicated, and a heavy burden on an operator is unavoidable.

Therefore, the present invention has been made in order to solve the above-described problem, and the main object thereof is to allow a chassis dynamometer, which tests a two-wheel drive vehicle, to reduce operating force on brakes while reducing a burden on an operator.

Solution to Problem

That is, a chassis dynamometer according to the present invention is one that tests a two-wheel drive vehicle, and includes: a driving wheel side roller on which the driving wheels of the vehicle are placed; a driven wheel side roller on which the driven wheels of the vehicle are placed; a driving wheel side power absorbing part connected to the driving wheel side roller; a braking force measuring part that measures braking force exerted on the driven wheel side roller; and a control part that with use of the braking force, measured by the braking force measuring part, sets the control target value of the power absorbing force of the driving wheel side power absorbing part to control the driving wheel side power absorbing part.

In such a configuration, since with use of the braking force measured by the braking force measuring part, the control target value of the power absorbing force of the driving wheel side power absorbing part is set to control the driving wheel side power absorbing part, deceleration is secondarily performed, and operating force on brakes can be reduced. As compared with the case of a simulated run by a conventional chassis dynamometer, a small brake operating force enables the vehicle to be decelerated, and therefore an actual road run can be accurately simulated. In addition, operating force on both the driving wheel side brakes and the driven wheel side brakes can also be reduced to suppress heat generation. Further, an operator is not required to preliminarily set the braking force of the driven wheel side brakes for each test vehicle, and a burden on the operator can be reduced.

When the chassis dynamometer further includes a driven wheel side power absorbing part connected to the driven wheel side roller, desirably the braking force measuring part is one that measures torque exerted on the driven wheel side power absorbing part.

In order to more accurately reproduce an actual road run, desirably, the control part sets the control target value with use of the rolling resistance of the driven wheels together with the braking force measured the braking force measuring part.

Also, in order to more accurately reproduce an actual road run, desirably, the control part sets the control target value with use of the mechanical inertia of the driven wheel side roller together with the braking force measured by the braking force measuring part.

In addition, a control method for a chassis dynamometer according to the present invention is a control method for a chassis dynamometer that tests a two-wheel drive vehicle, and the chassis dynamometer includes: a driving wheel side roller on which the driving wheels of the vehicle are placed; a driven wheel side roller on which the driven wheels of the vehicle are placed; a driving wheel side power absorbing part connected to the driving wheel side roller; and a braking force measuring part that measures braking force exerted on the driven wheel side roller. In addition, the control method sets the control target value of the power absorbing force of the driving wheel side power absorbing part to control the driving wheel side power absorbing part using the braking force measured by the braking force measuring part.

Further, a chassis dynamometer program according to the present invention is a program used for a chassis dynamometer that tests a two-wheel drive vehicle, and the chassis dynamometer includes: a driving wheel side roller on which the driving wheels of the vehicle are placed; a driven wheel side roller on which the driven wheels of the vehicle are placed; a driving wheel side power absorbing part connected to the driving wheel side roller; and a braking force measuring part that measures braking force exerted on the driven wheel side roller. In addition, the program instructs the chassis dynamometer to fulfill a function of, with use of the braking force measured by the braking force measuring part, setting the control target value of the power absorbing force of the driving wheel side power absorbing part to control the driving wheel side power absorbing part.

Advantageous Effects of Invention

According to the present invention described above, the chassis dynamometer that tests a two-wheel drive vehicle is capable of accurately reproducing an actual road run while reducing a burden on an operator.

BRIEF DESCRIPTION DRAWINGS

FIG. 1 is a diagram schematically illustrating the configuration of a chassis dynamometer of the present embodiment.

DESCRIPTION OF EMBODIMENTS

In the following, a chassis dynamometer according to one embodiment of the present invention will be described with reference to the drawing.

The chassis dynamometer 100 of the present embodiment is one that simulates an on-road run of a two-wheel drive vehicle 10 to test the vehicle 10, and as illustrated in FIG. 1, includes; a driving wheel side roller 2 on which the driving wheels 11 of the vehicle 10 are placed; a driven wheel side roller 3 on which the driven wheels 12 of the vehicle 10 are placed; a driving wheel side power absorbing part 4 connected to the driving wheel side roller 2; a driven wheel side power absorbing part 5 connected to the driven wheel side roller 3; and a control part 6 that controls the driving wheel side power absorbing part 4 and the driven wheel side power absorbing part 5. Note that FIG. 1 illustrates the case where the rear wheels are the driving wheels 11 and the front wheels are the driven wheels 12, but their relationship may be reversed.

Further, the control part 6 synchronously controls the respective power absorbing parts 4 and 5 so that the rotation speed of the driving wheel side roller 2 and the rotation speed of the driven wheel side roller 3 match each other, as well as torque-controls the driving wheel side power absorbing part 4 so as to achieve a predetermined running resistance set in a predetermined running mode. In addition, the respective power absorbing parts 4 and 5 in the present embodiment are ones of an electrical inertia control type. Also, a torque meter 7 is provided between the driving wheel side roller 2 and the driving wheel side power absorbing part 4 or to the driving wheel side power absorbing part 4, and the driving wheel side power absorbing part 4 is torque controlled by a torque detection signal from the torque meter 7.

Further, the chassis dynamometer 100 of the present embodiment includes a braking force measuring part 8 that, via the driven wheel side power absorbing part 5, measures braking force exerted from the driven wheels 12 onto the driven wheel side roller 3.

The braking force measuring part 8 in the present embodiment is a torque meter provided between the driven wheel side roller 3 and the driven wheel side power absorbing part 5 or to the driven wheel side power absorbing part 5, and detects torque exerted on the driven wheel side power absorbing part 5.

Also, the control part 6 is one that with use of the braking force (torque) exerted on the drive wheel side roller 3, which is measured by the braking force measuring part 8, sets the control target value of the power absorbing force of the driving wheel side power absorbing part 4 to control the power absorbing force (torque) of the driving wheel side power absorbing part 4.

Specifically, the control part 6 sets the control target value in accordance with the following method.

(1) Measurement of Driving Force on Driven Wheels 12 Side

The driving force Fveh2 of the driven wheels 12 exerted on the surface of the driven wheel side roller 3 is given by the following expression.

$$Fveh2 = Im2 \times dV/dt + Fdyno2$$

Here, Im2 represents the mechanical inertia of the driven wheel side roller 3, V represents the rotation speed of the driven wheel side roller 3, Fdyno2 represents the absorbing force (torque) of the driven wheel side power absorbing part 5. In addition, −Fvoh2 represents the braking force on the driven wheels 12 side.

Further, the rotation speed V of the driven wheel side roller 3 is detected by a rotation sensor provided to the driven wheel side roller 3, a connection shaft connected to the driven wheel side roller, or the driven wheel side power absorbing part 5. Alternatively, since the driven wheel side roller 3 is controlled synchronously with the driving wheel side roller 2, the rotation speed of the driving wheel side roller 2 may be used. Also, the absorbing force Fdyno2 of the driven wheel side power absorbing part 5 has a value measured by the braking force measuring part 8.

(2) Braking Force of Driven Wheel Side Brakes (Brake2)

The braking force on the driven wheels 12 side includes the rolling resistance of the driven wheels in addition to the braking force generated by the driven wheel side brakes.

Accordingly, the braking force Fbrk2 of the driven wheel side brakes (Brake2) is given by the following expression.

$$Fbrk2 = \text{Breaking force on driven wheels side} - \text{Estimated value}$$
$$\text{of maximum value of braking force by other than brakes}$$
$$= -Fveh2 - \text{Offset}$$

Here, the estimated value of the maximum value of braking force by other than the brakes Offset is a value equal to or more than the maximum braking force that can be generated by the rolling resistance of the tires. Specifically, Offset is desirably approximately 1.5 times to 2 times the term A of an expression for target running resistance.

Here, the target running resistance (RL[N]) is expressed by Expression (1) below.

$$RL = A + B \times V + C \times V^2 + M \times g \times \sin\theta$$

Where V: Vehicle Speed [m/s]
A, B, C: Running resistance constant
θ: Road gradient [deg]
M: Mass of vehicle (including driving vehicle and fuel) [kg]
g: Acceleration of gravity In addition, the values of the terms A, B, and C are changed depending on a vehicle type, road surface conditions, tire type, and the like, and different for each vehicle. The term C represents an air resistance coefficient, and the terms A and B respectively represent coefficients for the rolling resistance and other resistance.

(3) Setting of Control Target Value Fpau

The control target value Fpau of the power absorbing force of the driving wheel side power absorbing part 4 is given by the following expression in a conventional manner.

$$Fpau = Ie \times dV/dt + RLdyno$$

Here, Ie represents the amount of electrical inertia, and RLdyno represents target running resistance by the dynamometer.

The control part 6 in the present embodiment sets the control target value Fpau using the braking force Fbrk2 of the driven wheel side brakes. Specifically, the control part 6 sets the control target value Fpau in accordance with the following expression.

$$Fpau = Ie \times dV/dt + RLdyno + Fbrk2$$
$$= Ie \times dV/dt + RLdyno - Fveh2 - \text{Offset}$$
$$= Ie \times dV/dt + RLdyno - Im2 \times dV/dt - Fdyno2 - \text{Offset}$$

The chassis dynamometer 100 of the present embodiment sets the control target value of the power absorbing force of the driving wheel side power absorbing part 4 to control the driving wheel side power absorbing part 4 using the braking force (−Fveh2) measured by the braking force measuring part 8, and can therefore reduce the operating force on the brakes. As compared with the case of a simulated run by a conventional chassis dynamometer, a small brake operating force enables the vehicle 10 to be decelerated, and therefore an actual road run can be accurately simulated. In addition, a load on both the driving wheel side brakes and the driven wheel side brakes can also be reduced to suppress heat generation. Further, an operator is not required to preliminarily set the braking force of the driven wheel side brakes for each test vehicle, and a burden on the operator can be reduced.

In particular, in the present embodiment, since the control target value is set using the estimated value of the maximum value of braking force by other than the brakes Offset, in a braking deceleration state equal to or more than Offset, a small brake operating force enables the vehicle to be decelerated. Offset is around a value taking account of an increase in rolling resistance at low temperatures, and therefore even as compared with an actual road run, an increase in load on the brakes is very small.

<Variations>

Note that the present invention is not limited to the above-described embodiment.

In the expression for the control target value Fpau in the above-described embodiment, the mechanical inertia of the driven wheel side roller Im2 is not required to be used, or Offset is not required to be used.

The value of Offset may be adapted to be changed depending on the temperature of the driven wheels 12, or depending on the rotation speed of the driven wheel side roller 3.

The chassis dynamometer of the above-described embodiment can also be applied to a four-wheel drive vehicle applied with two-wheel drive control.

The chassis dynamometer of the above-described embodiment is such that the roller on which the front wheels are placed is connected with the power absorbing part and the roller on which the rear wheels are placed is connected with the power absorbing part, and can therefore be used as a chassis dynamometer for four-wheel drive vehicles. As described, the chassis dynamometer of the above-described embodiment can be used switching between for two-wheel drive vehicles and four-wheel drive vehicles.

Besides, various modifications and combinations of the embodiment and the variations may be made without departing from the scope of the present invention.

REFERENCE SIGNS LIST

100: Chassis dynamometer
10: Vehicle
11: Driving wheels
12: Driven wheels
2: Driving wheel side roller
3: Driven wheel side roller
4: Driving wheel side power absorbing part
5: Driven wheel side power absorbing part
6: Control part
8: Braking force measuring part

The invention claimed is:

1. A chassis dynamometer that tests a two-wheel drive vehicle, the chassis dynamometer comprising:
    a driving wheel side roller on which driving wheels of the vehicle are placed, wherein the driving wheels are front or rear wheels of the vehicle;
    a driven wheel side roller on which driven wheels of the vehicle are placed, wherein the driven wheels are the other of the front or rear wheels of the vehicle;
    a driving wheel side power absorbing part connected to the driving wheel side roller;
    a braking force measuring part that measures braking force of a driven wheel side brake exerted on the driven wheel side roller; and
    a control part that with use of the braking force measured by the braking force measuring part, sets a control target value of power absorbing force of the driving wheel side power absorbing part to control the driving wheel side power absorbing part, wherein the driving wheel side roller and driven wheel side roller are configured to operate at a same time.

2. The chassis dynamometer according to claim 1, wherein
the control part sets the control target value on a basis of running resistance.

3. The chassis dynamometer according to claim 1, further comprising
a driven wheel side power absorbing part connected to the driven wheel side roller, wherein
the braking force measuring part is one that measures torque exerted on the driven wheel side power absorbing part.

4. The chassis dynamometer according to claim 1, wherein
the control part sets the control target value with use of rolling resistance of the driven wheels together with the braking force measured by the braking force measuring part.

5. The chassis dynamometer according to claim 1, wherein
the control part sets the control target value with use of mechanical inertia of the driven wheel side roller together with the braking force measured by the braking force measuring part.

6. A control method for a chassis dynamometer that tests a two-wheel drive vehicle, the chassis dynamometer including a driving wheel side roller on which driving wheels of the vehicle are placed, a driven wheel side roller on which driven wheels of the vehicle are placed, a driving wheel side power absorbing part connected to the driving wheel side roller, and a braking force measuring part that measures braking force of a driven wheel side brake exerted on the driven wheel side roller, wherein the driving wheels are front or rear wheels of the vehicle and wherein the driven wheels are the other of the front or rear wheels of the vehicle, the control method comprising:
with use of the braking force measured by the braking force measuring part, setting a control target value of power absorbing force of the driving wheel side power absorbing part to control the driving wheel side power absorbing part, and
operating the driving wheel side roller and driven wheel side roller at a same time.

7. A tangible, non-transitory computer-readable medium storing instructions that, when executed by a computer, cause the computer to instruct a chassis dynamometer, that tests a two-wheel drive vehicle and includes a driving wheel side roller on which driving wheels of the vehicle are placed, a driven wheel side roller on which driven wheels of the vehicle are placed, a driving wheel side power absorbing part connected to the driving wheel side roller, and a braking force measuring part that measures braking force of a driven wheels side brake exerted on the driven wheel side roller,
to set a control target value of power absorbing force of the driving wheel side power absorbing part to control the driving wheel side power absorbing part with use of the braking force measured by the braking force measuring part, wherein the driving wheels are front or rear wheels of the vehicle and wherein the driven wheels are the other of the front or rear wheels of the vehicle, and
to operate the driving wheel side roller and driven wheel side roller at a same time.

* * * * *